(12) United States Patent
Zhang et al.

(10) Patent No.: US 11,092,874 B1
(45) Date of Patent: Aug. 17, 2021

(54) PHASE-SHIFT MATCHED FRESNEL LAYERS

(71) Applicant: Oculus VR, LLC, Menlo Park, CA (US)

(72) Inventors: Qi Zhang, Bellevue, WA (US); Robin Sharma, Redmond, WA (US); Andrew John Ouderkirk, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 276 days.

(21) Appl. No.: 16/050,878

(22) Filed: Jul. 31, 2018

(51) Int. Cl.
| | |
|---|---|
| G03H 1/00 | (2006.01) |
| G02F 1/35 | (2006.01) |
| G02B 3/08 | (2006.01) |
| G02B 27/01 | (2006.01) |
| G02B 5/09 | (2006.01) |

(52) U.S. Cl.
CPC ............ G02F 1/3544 (2013.01); G02B 3/08 (2013.01); G02B 5/09 (2013.01); G02B 27/0101 (2013.01)

(58) Field of Classification Search
CPC ............... G02B 27/0172; G02B 27/10; G02B 27/0176; G02B 27/0101; G02B 27/01; G02B 27/0093; G02B 27/017; G02B 27/283; G02B 3/02; G02B 3/08; G02B 1/10; G02B 5/09; G02B 5/1876; G02B 5/08; G02B 5/30; G02B 5/04; G02B 2027/014; G02B 2027/0114; G02B 2027/0138; G02B 2027/0178; G02B 2027/0118; G02B 2027/0187; G02B 2027/0123; G02B 2027/015; G02B 2027/013; G02B 2027/012; G02B 2027/0152; G02F 1/3544; G02F 1/353; G02F 1/35; G02F 1/133602; G06F 3/013; G06F 3/017; G06F 3/011; G06F 3/005; G06F 3/012; G06F 1/163; G06T 19/006; G06K 9/00671; H02N 5/33; B32B 2307/416
USPC ........................... 359/742, 618, 630, 629, 13
See application file for complete search history.

(56) References Cited

U.S. PATENT DOCUMENTS

| | | | | |
|---|---|---|---|---|
| 10,747,009 | B1* | 8/2020 | Sharma | G02B 3/08 |
| 10,845,598 | B1* | 11/2020 | Zhang | G02B 27/0172 |
| 10,852,544 | B1* | 12/2020 | Zhang | G02B 27/10 |
| 2002/0181117 | A1* | 12/2002 | Huang | H04N 9/3105 |
| | | | | 359/634 |
| 2014/0231625 | A1* | 8/2014 | Chang | G06F 1/1684 |
| | | | | 250/208.1 |
| 2017/0322417 | A1* | 11/2017 | Sekiguchi | G02B 6/0018 |

(Continued)

OTHER PUBLICATIONS

U.S. Appl. No. 16/050,834, Zhang.

(Continued)

*Primary Examiner* — Stephone B Allen
*Assistant Examiner* — Jyotsna V Dabbi
(74) *Attorney, Agent, or Firm* — Freestone Intellectual Property Law PLLC; Aaron J. Visbeek

(57) ABSTRACT

An optical structure includes a refractive material, a Fresnel surface, a dichroic reflective coating and a second coating. The refractive material has a refractive index. The Fresnel surface is formed in the refractive material and the Fresnel surface includes active surfaces and draft surfaces. The dichroic reflective coating is selectively disposed on the active surface. A second coating is selectively disposed on the draft surfaces.

20 Claims, 12 Drawing Sheets

(56) References Cited

U.S. PATENT DOCUMENTS

| | | |
|---|---|---|
| 2018/0113508 A1* | 4/2018 | Berkner-Cieslicki ........................ G06T 19/006 |
| 2018/0239147 A1 | 8/2018 | Schowengerdt et al. |
| 2019/0227322 A1 | 7/2019 | Schaub |

OTHER PUBLICATIONS

U.S. Appl. No. 16/050,932, Zhang.
Non-Final Office Action, U.S. Appl. No. 16/050,834, dated Mar. 27, 2020, 11 pages.

* cited by examiner

PHASE-SHIFT MATCHED FRESNEL LAYERS

CROSS-REFERENCE TO RELATED APPLICATIONS

This application is related to U.S. non-provisional patent applications entitled, "Multilayer Dichroic Phase Matching for Fresnel Optics" and "Two-Index Selectively Coated Fresnel," filed the same day.

TECHNICAL FIELD

This disclosure relates generally to optics, and in particular to phase matching for Fresnel optics.

BACKGROUND INFORMATION

Lenses and other optical elements are ubiquitous in both consumer and commercial products such as cameras, displays, and sensors. Fresnel lenses were famously developed in the early 1800s and originally deployed in lighthouses to increase the distance that the light from the lighthouse could be viewed by ships. Using Fresnel lenses can be advantageous in that they are thinner (and often lighter) than conventional lenses with similar optical power. In some contexts, Fresnel optical elements are used to provide lensing for particular portions of the light spectrum. Yet, conventional designs for Fresnel optical elements that provide lensing for certain light spectrums present optical integrity challenges.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1A:
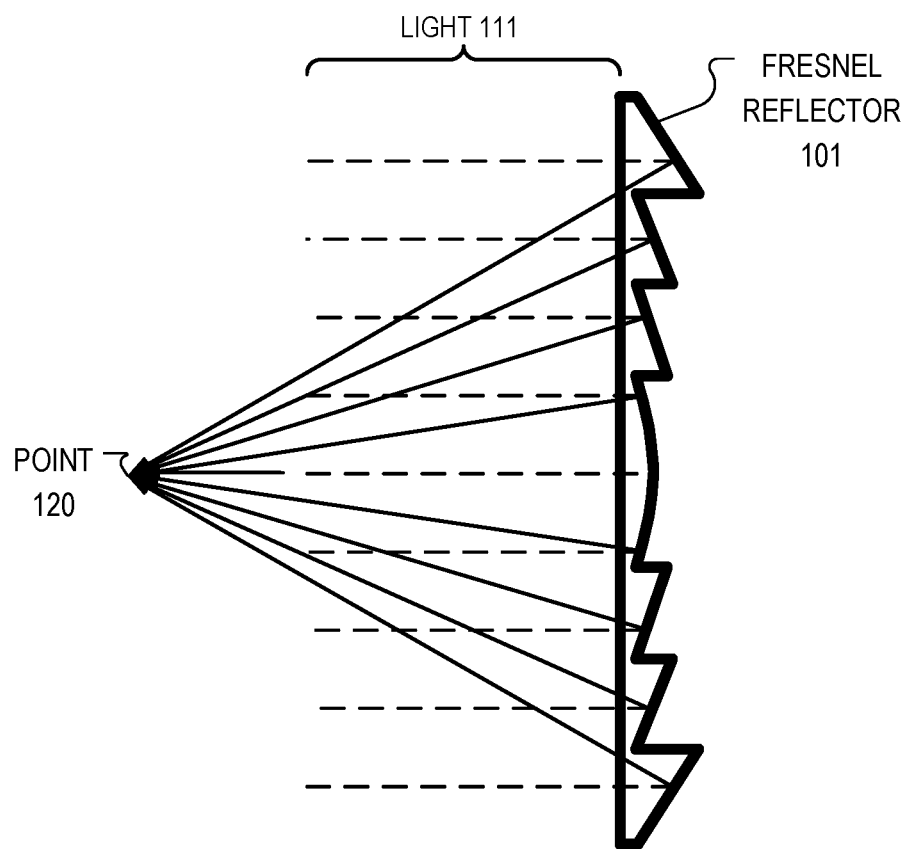
FIGS. 1A and 1B illustrate example Fresnel optical elements redirecting incoming light, in accordance with embodiments of the disclosure.

Embodiments of a Fresnel optical elements and processes of fabricating Fresnel optical elements are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The Fresnel optical elements and processes of fabricating Fresnel optical elements are described in this disclosure. The Fresnel optical elements of this disclosure may be used in a head mounted display (HMD) to direct infrared light reflecting off an eye of a wearer of the HMD to a camera while also allowing scene light to propagate to the eye(s) of the wearer. Embodiments of Fresnel optical elements of the disclosure include active surfaces that are selectively coated with a "hot mirror" layer (reflecting infrared light and passing visible light) to direct infrared light to a camera while also passing scene light for viewing by the wearer of the HMD. Of course, the embodiments of the disclosure may be used in other contexts, in addition to HMDs.

Prior Fresnel optical elements included Fresnel surfaces with selectively coated active surfaces. However, the selective coating on the active surface may cause undesirable optical artifacts from see-through scene light having different optical path lengths due to the scene light propagating through the hot mirror coating on the active surfaces and the uncoated draft surfaces. In particular, a diffraction effect may be induced by the periodic phase jump and periodic transmissivity variation and stray light issues (e.g. ghost images) may arise from multi-reflection in the Fresnel structure. Since the hot mirror coating introduces a different refractive index, the scene light may encounter different optical path lengths when propagating through the coated active surface and the uncoated draft surface and undesirable constructive or destructive interference of the scene light may occur as a result.

Fresnel surfaces having active surfaces that are selectively coated with a "hot mirror" are disclosed along with techniques to reduce or eliminate a phase differential of scene light propagating through the Fresnel surface. In one embodiment, the hot mirror coating on the active surface is index-matched to a refractive material that the Fresnel surface is formed in so that scene light (in the visible spectrum) encounters the same or similar index of refraction whether it propagates through the draft surfaces or the active surfaces of the Fresnel surface. In one embodiment, the draft surface is coated with a second coating with a refractive index that gives scene light passing through the Fresnel surface the same optical path length whether the scene light propagates through the draft surface of the active surface. In this way, scene light propagating through the dichroic reflective coating experiences the same phase shift as the scene light propagating through the second coating. The Fresnel surfaces along with the selective coating on the active surfaces may be "immersed" in a material having the same refractive index as the material that the Fresnel surface is formed in to keep the optical path length the same or similar for scene light.

In an embodiment of the disclosure, a two-index optical structure includes a Fresnel surface with selectively coated active surfaces. The Fresnel surface and a replica layer that is a negative of the Fresnel surface is formed in a higher-index material with a higher refractive index than a first refractive layer that the Fresnel surface is disposed on. The higher-index material may be matched to an average refractive index of the coating on the active surfaces. The thickness of the higher-index material may be limited to the extent that only a thickness of the higher-index material necessary to form the Fresnel surface is utilized. Reducing the thickness of the higher-index material may improve the viewing of images from scene light passing through the two-index optical structure.

These and other embodiments are described in detail below in association with FIGS. 1A-9.

FIG. 1A illustrates a cross-section of an on-axis Fresnel reflector 101 receiving incoming light 111 (illustrated with dashed lines) and focusing the light (in reflection) to a point 120. The reflected light is illustrated as solid lines, in FIGS. 1A and 1B. Fresnel reflectors can be utilized to direct and focus light, in reflection.

Figure 1B:
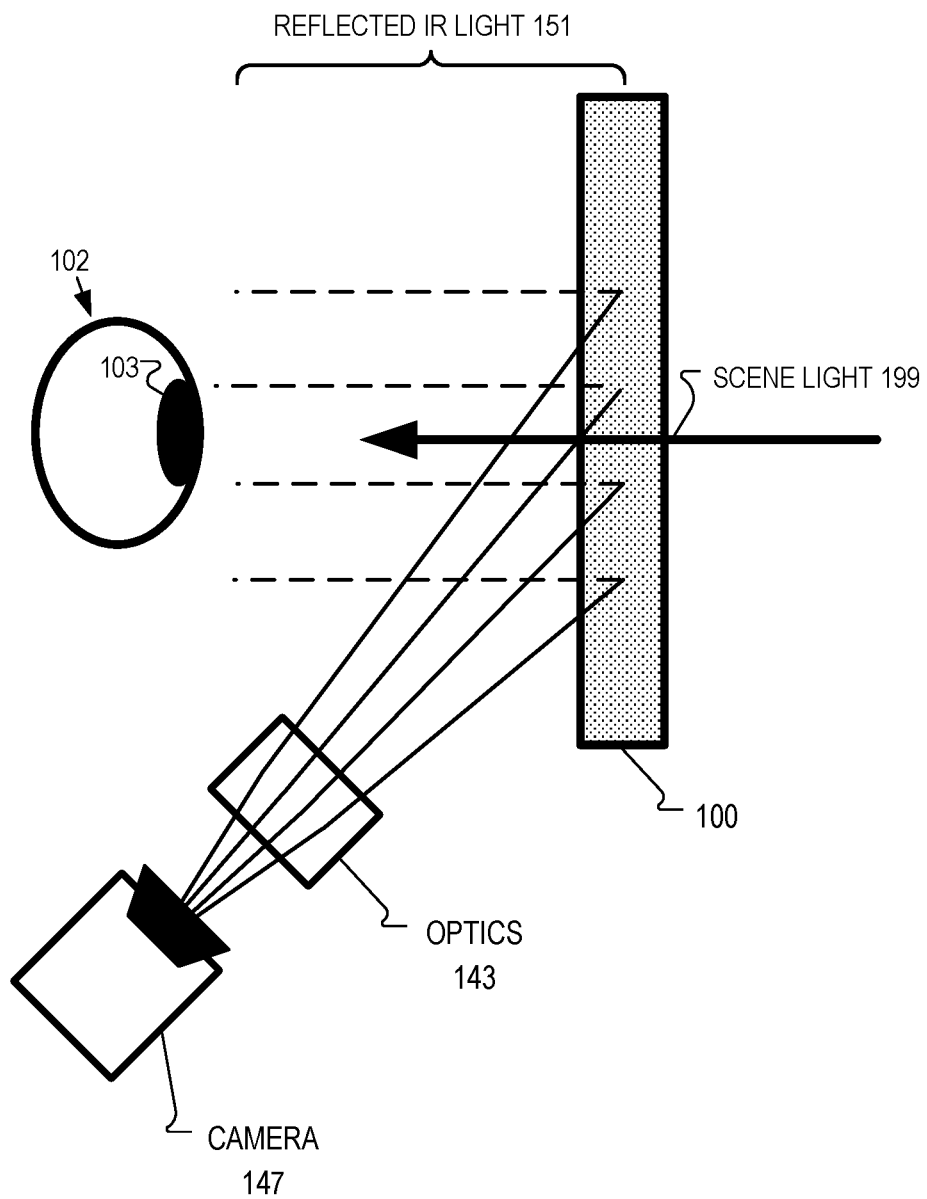

FIG. 1B illustrates an optical combiner 100 that includes a Fresnel optical element that directs reflected infrared light 151 to camera 147 while allowing scene light 199 to propagate through optical combiner 100 to eye 102, in accordance with an embodiment of the disclosure. Reflected infrared light 151 is reflected from eye 102 and a Fresnel optical reflector included in optical combiner 100 directs and focuses the infrared light to camera 147. The Fresnel optical reflector included in optical combiner 100 may be a one dimensional prism array or an off-axis Fresnel lensing shape to direct reflected infrared light 151 to camera 147. Optics 143 may include one or more lenses to assist in focusing the infrared light for camera 147. Camera 147 may be a CMOS image sensor that includes a filter that passes infrared light while rejecting visible light (e.g. wavelength of 380 nm-730 nm). Camera 147 may be included in an HMD such as HMD 900 that will be discussed in more detail in connection with the description of FIG. 9. Eye 102 includes pupil 103 and may be illuminated by infrared light emitted from a diode include in an HMD. Camera 147 may be configured to image eye 102 to determine a position of pupil 103 for eye-tracking purposes.

Figure 2A:
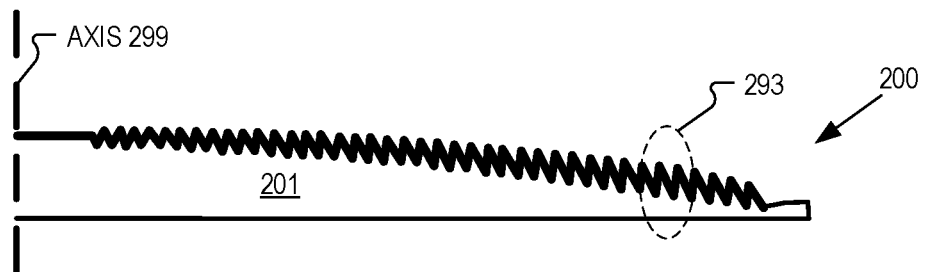
FIGS. 2A and 2B illustrate a portion of a Fresnel optical element having a Fresnel surface including active surfaces and draft surfaces, in accordance with an embodiment of the disclosure.

FIG. 2A illustrates a side view of an example Fresnel surface 200 formed in a refractive material 201. The illustrated Fresnel optical surface 200 is rotationally symmetric around a central axis 299, although not all Fresnel optical elements are rotationally symmetric. FIG. 2A illustrates that the Fresnel features of the Fresnel surface may increase in size as a distance of the Fresnel feature from the central axis 299 increases.

Figure 2B:
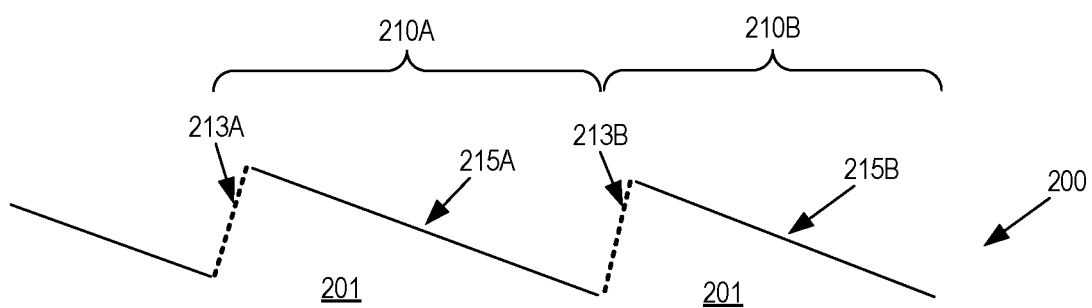

FIG. 2B illustrates a zoomed-in view of view 293 of FIG. 2A. FIG. 2B includes Fresnel features 210A and 210B. Fresnel features 210 each include a draft surface 213 (dashed lines) and an active surface 215 (solid line). Active surfaces 215 provide the optical power for Fresnel surface 200. Although only two Fresnel features are illustrated as examples throughout the disclosure, those skilled in the art understand that each Fresnel optical element may have many more Fresnel features 210 and that the techniques disclosed herein may be applied to all of the Fresnel features in a Fresnel optical element.

Figure 3:
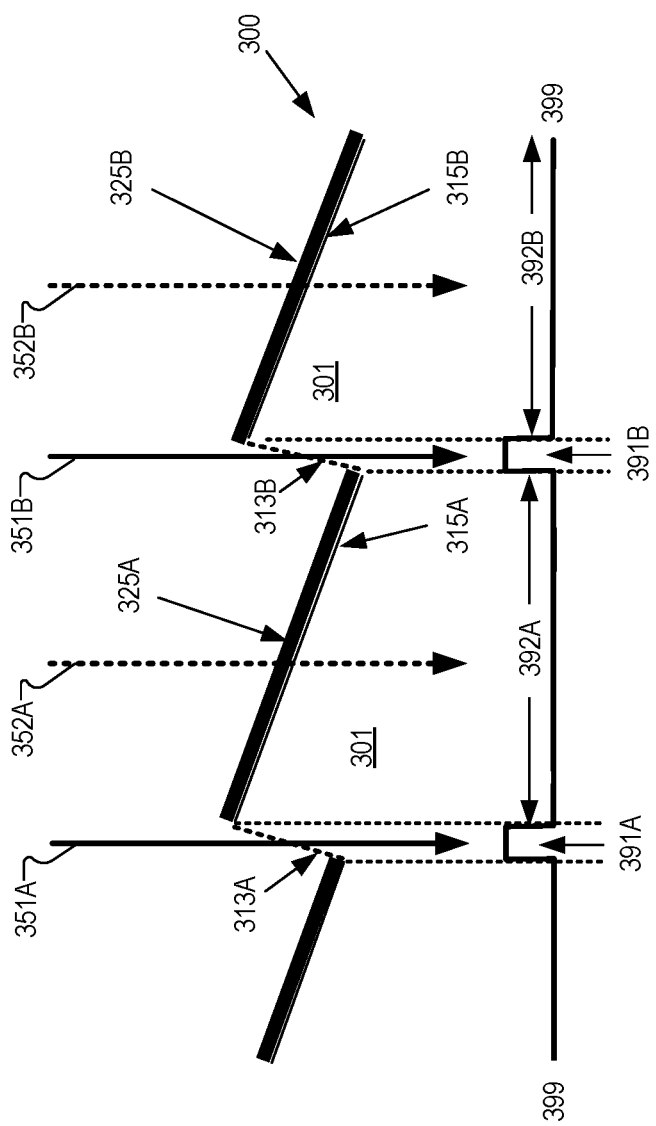
FIG. 3 illustrates a Fresnel reflector having selectively coated active surfaces.

FIG. 3 illustrates a side view of a portion of a Fresnel reflector having active surfaces selectively coated with a reflective material. FIG. 3 illustrates a Fresnel surface 300 formed in a refractive material 301. Fresnel surface 300 includes a first Fresnel feature that includes draft surface 313A and an active surface 315A. Fresnel surface 300 also includes a second Fresnel feature that includes a draft surface 313B and an active surface 315B. The active surfaces 315A and 315B are selectively coated with coating segments 325A and 325B, respectively.

Coating 325 may be a hot mirror coating, for example. The hot mirror coating may reflect infrared light while passing substantially all light in the visible spectrum. Fresnel surface 300 may be configured to direct and focus infrared light reflected off an eye of a wearer of an HMD to a camera while passing scene light (visible light) to an eye of a wearer of an HMD. However, a scene light image 399 may be out of phase because coating 325 introduces a difference in optical path lengths taken by scene light propagating along optical paths 351 and 352 due to the coating 325 having a different refractive index as refractive material 301. To illustrate, portions 391A and 391B of scene light image 399 are out of phase with portions 392A and 392B of scene light image 399 in FIG. 3. The out of phase nature of scene light image 399 may cause undesirable optical artifacts (e.g. rainbow effect, ghost images, and other stray light issues) that are noticeable by a wearer of a HMD that is viewing scene light through an optical combiner that includes Fresnel surface 300.

Figure 4A:
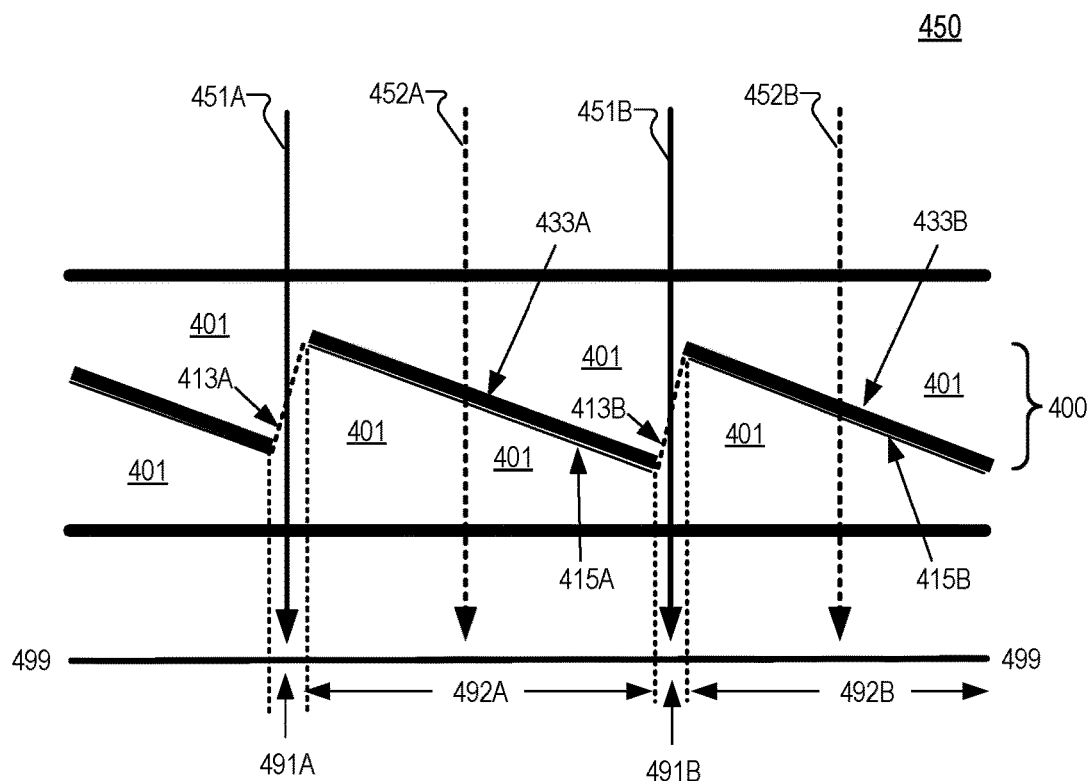
FIGS. 4A and 4B illustrates an example Fresnel surface having a coating on the active surfaces that is index-matched to a refractive material, in accordance with an embodiment of the disclosure.

FIG. 4A illustrates an optical structure 450 including a Fresnel surface 400 formed in a refractive material 401, in accordance with an embodiment of the disclosure. Refractive material 401 may include any of poly-methyl-methacrylate (PMMA), polycarbonate, cyclic-olefin polymer (e.g. Zeonex™), styrene, or polyester (e.g. OKP-4™). Fresnel surface 400 includes active surfaces 415 and draft surfaces 413. A coating 433 is selectively disposed on the active surfaces 415, but not the draft surfaces 413. In FIG. 4, coating segment 433A is disposed on active surface 415A and coating segment 433B is disposed on active surface 415B. Coating 433 may be a dichroic coating. In one embodiment, coating 433 is a multilayer hot mirror coating that reflects near-infrared light while passing visible light. Coating 433 may be a multilayer coating having three or more layers.

Figure 4B:
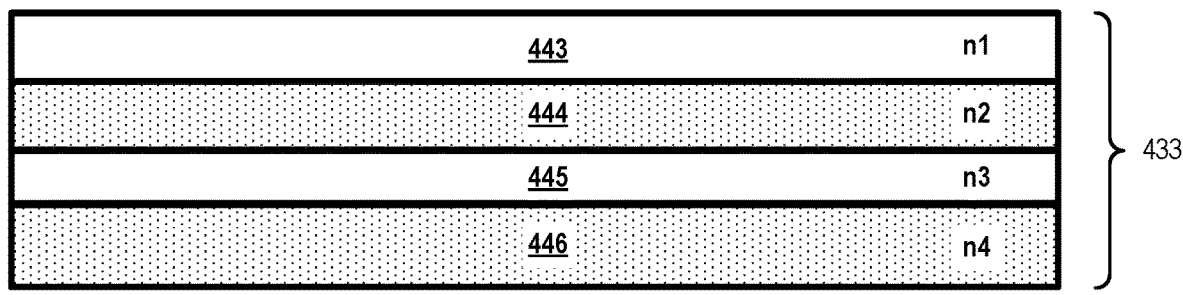

FIG. 4B illustrates an example coating 433 having layers 443, 444, 445, and 446 with refractive indexes n1, n2, n3, and n4, respectively. The average refractive index of coating 433 is substantially the same as the refractive index of refractive material 401. Coating 433 may have more than four layers in some embodiments and the average refractive index of those layers would be substantially the same as the refractive index of refractive material 401. In one embodiment, layer 443 is made of the same material as layer 445 and layer 444 is made of the same material as layer 446. The thicknesses of layers 443, 444, 445, and 446 may be tune to constructively and/or destructively interfere light of particular wavelengths in order to impart dichroic characteristics to coating 433.

In one embodiment, coating 433 includes at least one layer of niobium pentoxide ($Nb_2O_5$) and at least one layer of silicon dioxide (SiO$_2$). In one embodiment, coating 433 includes at least one layer of titanium dioxide (TiO$_2$) and at least one layer of silicon dioxide. In one embodiment, coating 433 includes at least one layer of silicon nitride (Si$_3$N$_4$) and at least one layer of magnesium fluoride (MgF$_2$). Coating 433 may include other layers of dielectric material to achieve the desired index-matching coating design.

Referring again to FIG. 4A, coating 433 and the draft surfaces 413 are immersed in a transparent material having a same refractive index as the refractive material 401. The transparent material is illustrated as the same refractive material 401, in FIG. 4A. In one embodiment, refractive material 401 has a refractive index greater than 1.65. In one embodiment, the refractive index of refractive material 401 is greater than 1.7. In one embodiment, the refractive index of refractive material 401 is greater than 1.8. The refractive index of refractive material 401 may be approximately 1.5, in some embodiments.

With coating 433 index-matched to refractive material 401 and Fresnel surface 400, and with coating 433 immersed in refractive material 401, scene light propagating along optical paths 452A and 452B (through coating segments 433A/433B and active surfaces 415A/415B) encounters the same or substantially the same refractive index as it propagates through optical structure 450. Similarly, scene light propagating along optical paths 451A and 451B (through draft surfaces 413A and 413B) also encounters the same refractive index (the refractive index of material 401) that scene light propagating along optical paths 452A and 452B does. Therefore, scene light image 499 is in phase as portions 491A and 491B of scene light image 499 are in phase with portions 492A and 492B of scene light image 499 in FIG. 4A.

Designers of optical structure 450 may select a refractive material 401 having a high index of refraction (e.g. greater than 1.65) since coating 433 may have a refractive index greater than 1.65. The thicknesses of layers of coating 433 may then be tuned so that the average refractive index of coating 433 is the same as refractive material 401. Notably, the thicknesses of the layers of coating 433 must still be designed to achieve the desired dichroic attributes (e.g. hot mirror), in some embodiments. Designers of optical structure 450 may also select a coating 433 and then select a refractive material 401 having the same or substantially the same refractive index as the average refractive index of coating 433. In one embodiment, the coating 433 is designed to have an average refractive index of approximately 1.5 and the refractive material 401 has a refractive index that matches.

Figure 5:
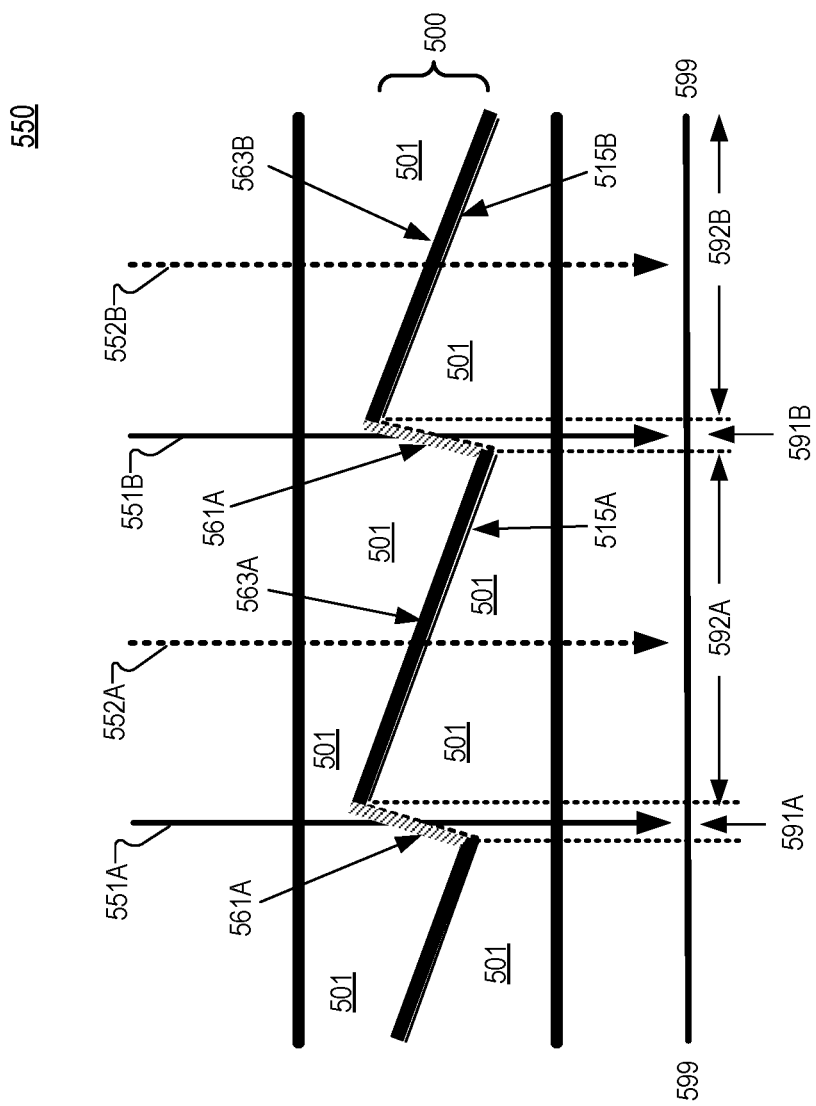
FIG. 5 illustrates an example Fresnel surface having a first coating deposited on the active surfaces that imparts a same phase jump as a second coating disposed on the draft surfaces, in accordance with an embodiment of the disclosure.

FIG. 5 illustrates an optical structure 550 including a Fresnel surface 500 formed in a refractive material 501, in accordance with an embodiment of the disclosure. Refractive material 501 may include any of poly-methyl-methacrylate (PMMA), polycarbonate, cyclic-olefin polymer (e.g. Zeonex™), styrene, or polyester (e.g. OKP-4™). Fresnel surface 500 includes active surfaces 515 and draft surfaces. A coating 563 is selectively disposed on the active surfaces 515 and coating 561 is selectively disposed on the draft surfaces. In FIG. 5, coating segment 563A is disposed on active surface 515A, coating segment 563B is disposed on active surface 515B, and coating segments 561A and 561B are disposed on the draft surfaces. Scene light (e.g. 551 and 552) propagating through the layer 563 experiences the same phase shift as the scene light propagating through the layer 561.

In one embodiment, coating 563 is a multilayer hot mirror coating that reflects near-infrared light while passing visible light. Coating 563 may be a dichroic coating. Coating 563 may be a multilayer coating having three or more layers. Coating 563 may include the embodiments of coating 433 described in connection with FIGS. 4A and 4B. Coating 561 may be a multilayer coating or a single layer coating that passes both visible light and non-visible light (including infrared light).

A first average refractive index of the coating 563 is substantially the same as a second average refractive index of coating 561, in one embodiment. The thickness of coating 563 may be substantially the same as a thickness of coating 561 from the perspective of incident scene light so that the scene light has a same optical path length when propagating along optical path 551 or 552.

With coating 561 having an average refractive index substantially the same as coating 563, the phase change of incident scene light that is imparted by coating 563 on active surfaces 515 is substantially the same and coating 561 on the draft surfaces. And, since Fresnel surface 500 and coatings 561/563 are immersed in refractive material 501, scene light propagating along optical paths 551 and 552 have the same optical length as it propagates through optical structure 550. Therefore, scene light image 599 is in phase as portions 591A and 591B of scene light image 599 are in phase with portions 592A and 592B of scene light image 599 in FIG. 5.

Designers of optical structure 550 may select a coating 561 to have the same average refractive index of coating 563. Or designers of optical structure 550 may tune coating 563 to have the same average refractive index of coating 561. In one embodiment, coating 561 has an average refractive index that is different from an average refractive index of coating 563 while both coatings 561 and 563 impart the same phase shift to incident scene light.

Figure 6:
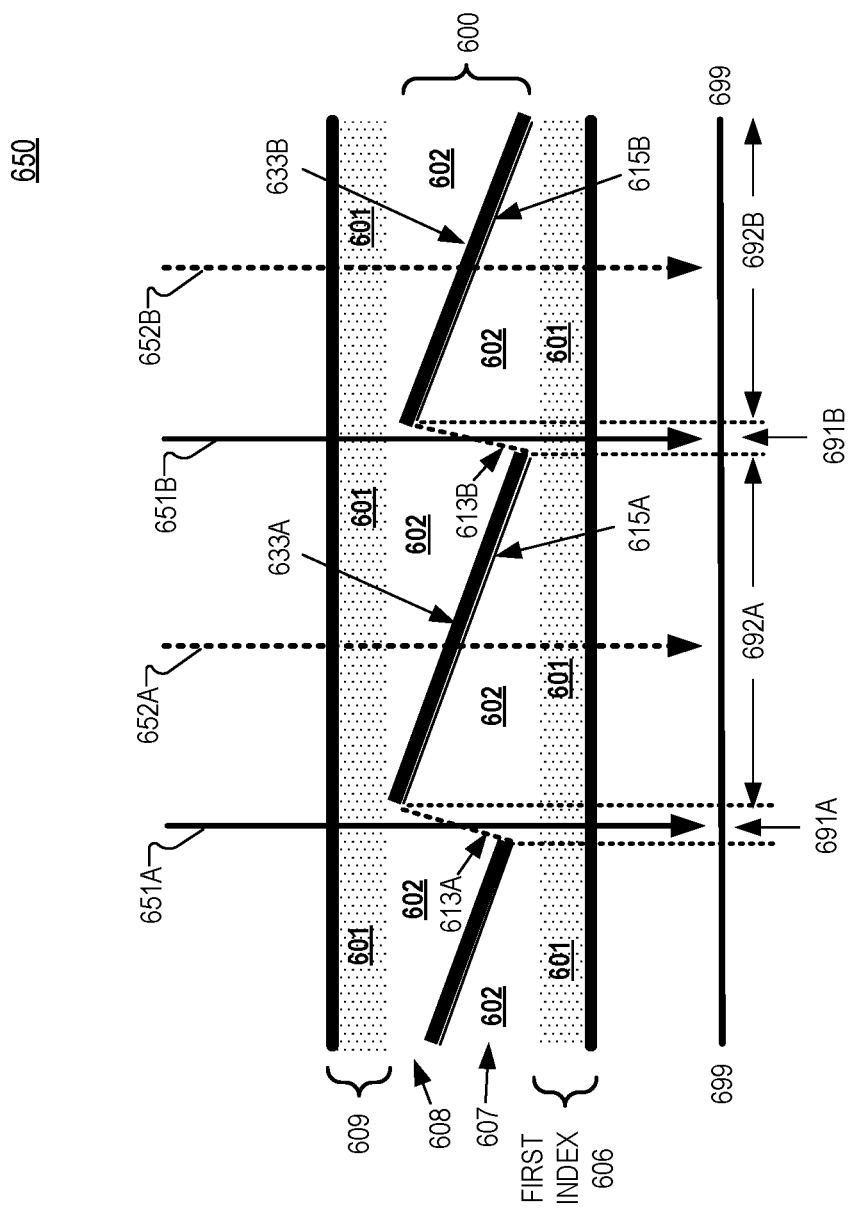
FIG. 6 illustrates an example two-index Fresnel reflector with selectively coated active surfaces, in accordance with an embodiment of the disclosure.

FIG. 6 illustrates an example two-index Fresnel reflector with selectively coated active surfaces, in accordance with an embodiment of the disclosure. FIG. 6 includes an optical structure 650 including a first refractive layer 606 including a first refractive material 601 having a first refractive index. Optical structure 650 also includes a Fresnel surface 600 formed in a second refractive layer 607 including a second refractive material 602 with a second refractive index different than the first refractive index. Second refractive material 602 may have a higher index of refraction than first refractive material 601. Fresnel surface 600 includes active surfaces 615 and draft surfaces 613. A coating 633 is selectively disposed on the active surfaces 615, but not the draft surfaces 613. In FIG. 6, coating segment 633A is disposed on active surface 615A and coating segment 633B is disposed on active surface 615B. In one embodiment, coating 633 is a multilayer hot mirror coating that reflects near-infrared light while passing visible light. Coating 633 may include the properties of coating 433 described in connection with FIGS. 4A and 4B.

A replica layer 608 is disposed between Fresnel surface 600 and a third refractive layer 609, in FIG. 6. Replica layer 608 is a negative of the Fresnel surface 600 and "immerses" the draft surfaces 613 and coating 633 in the same refractive material 602 having the second refractive index, in the illustrated embodiment. In one embodiment, replica layer 608 is a rigid element that is bonded to draft surfaces 613 and coating 633 with a bonding material having the second refractive index. The third refractive layer 609 is made of the first refractive material 601 having the first refractive index, in the illustrated embodiment. In one embodiment (not illustrated), replica layer 608 is a cured material that was poured or injected into a gap between third refractive layer 609 and Fresnel surface 600 and allowed to cure. The cured material has the second refractive index.

The optical structure 650 is similar to optical structure 450 in that an average refractive index of coating 633 is substantially the same as the refractive index of the material 602 that Fresnel surface 600 is formed in. The two-index design of optical structure 650 reduces the thickness of a higher index material (e.g. 602) used to form Fresnel surface 600, which may reduce a "haze" effect when compared with Fresnel structures that are formed in thicker high-index refractive materials. In particular, the thickness of the higher-index material 602 may be limited to the thickness necessary to form the Fresnel surface 600 in second refractive layer 607 and immerse the Fresnel surface 600 with replica layer 608. Reducing the thickness of the higher-index material may improve the viewing of images from scene light passing through the two-index optical structure. First refractive layer 606 and third refractive layer 609 may be included in optical structure 650 to improve the structural rigidity and/or facilitate the manufacturability of optical structure 650 without inducing non-uniform phase changes in incident scene light propagating through optical structure 650.

Figure 7A:
FIGS. 7A-7E illustrate an example process of fabricating a two-index Fresnel reflector, in accordance with an embodiment of the disclosure.

FIGS. 7A-7E illustrates an example process of fabricating a two-index Fresnel reflector using a bonded replica layer, in accordance with an embodiment of the disclosure. In FIG. 7A, a first refractive layer 606 having a first refractive index is provided.

Figure 7B:
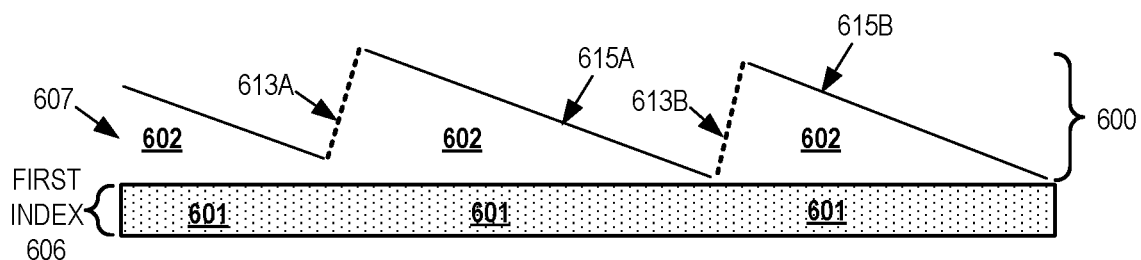

In FIG. 7B, a Fresnel surface 600 including active surfaces 615 and draft surfaces 613 is formed in a second refractive layer 607. Second refractive layer 607 may be bonded to first refractive layer 606 and the second refractive layer 607 may be diamond-turned to form the illustrated Fresnel surface 600. Bonding the second refractive layer 607 to the first refractive layer 606 may give the optical structure of FIG. 7B the rigidity it needs to undergo a diamond turning process step while still limiting the higher index material 602 to the thickness required to support the formation of Fresnel surface 600.

Figure 7C:
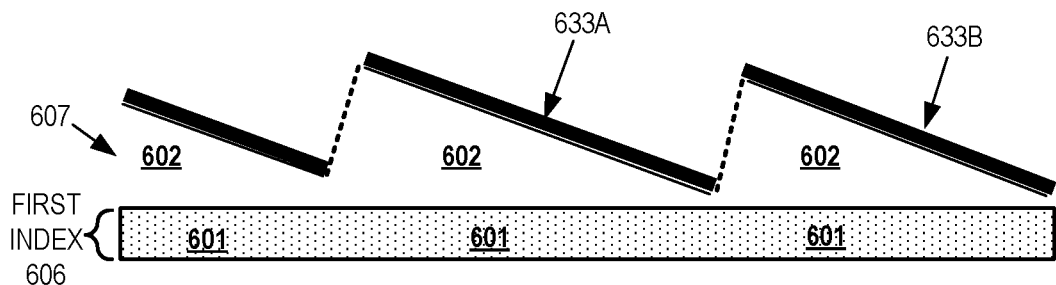

In FIG. 7C, coating 633 is selectively forming on the active surfaces 615 of the Fresnel surface.

Figure 7D:
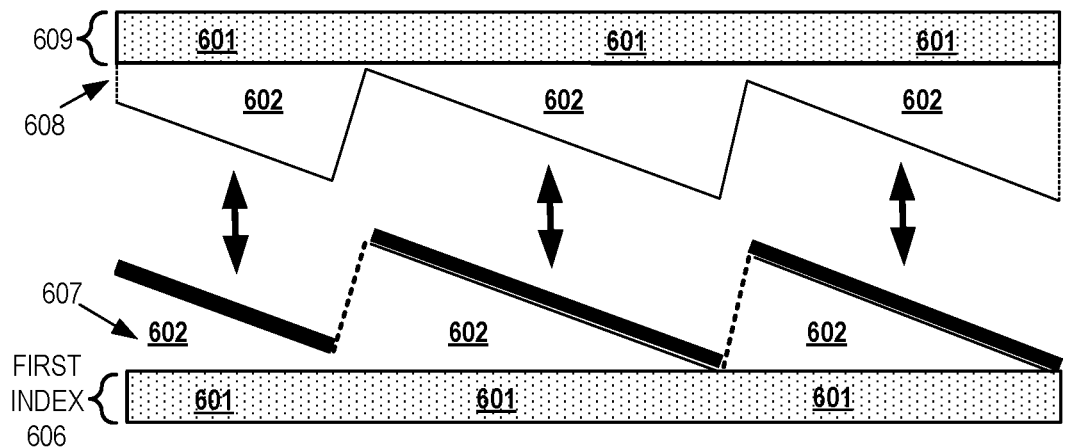

In FIG. 7D replica layer 608 is bonded to the coating 633 disposed on the active surfaces 615 of the Fresnel surface. The replica layer 608 may be bonded with an index-matching bonding material having the second refractive index (same refractive index as material 602). In the illustrated embodiment, replica layer 608 is bonded to the third refractive layer 609. The negative image of Fresnel surface 600 may be formed on the replica layer 608 by a subtractive diamond-turning process while the second refractive material 602 is bonded to first refractive material 601 of third refractive layer 609.

Figure 7E:
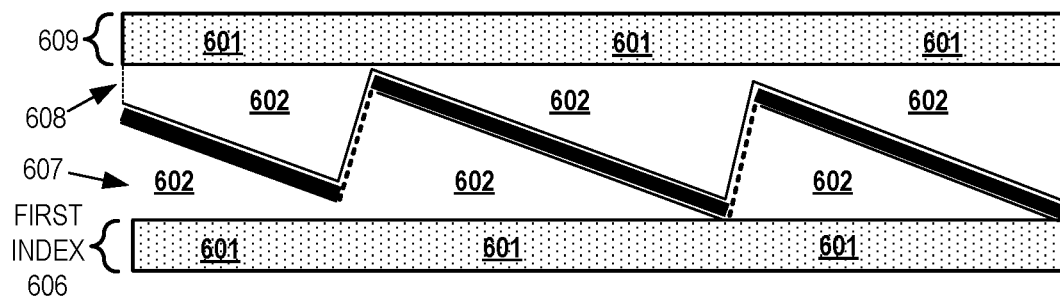

FIG. 7E illustrates the resulting optical structure 750 after the replica layer 608 is bonded to second refractive layer 607 and the coating 633 that is disposed on active surfaces 615.

FIGS. 8A-8E illustrates an example process of fabricating a two-index Fresnel reflector using a cured replica layer, in accordance with an embodiment of the disclosure.

Figure 8A:
FIGS. 8A-8E illustrate another example process of fabricating a two-index Fresnel reflector, in accordance with an embodiment of the disclosure.
Figure 8B:
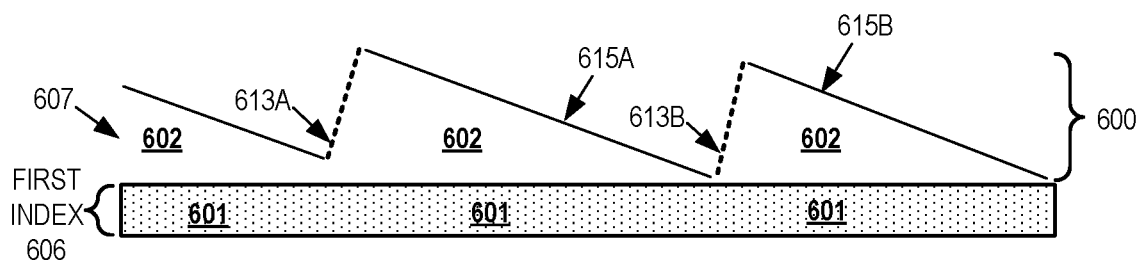
Figure 8C:
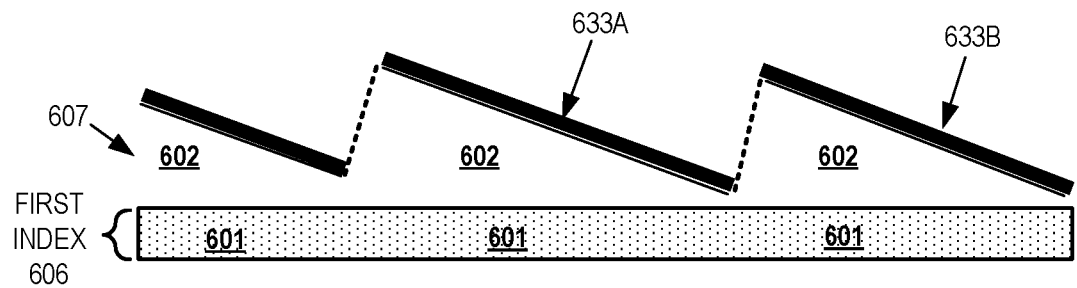
Figure 8D:
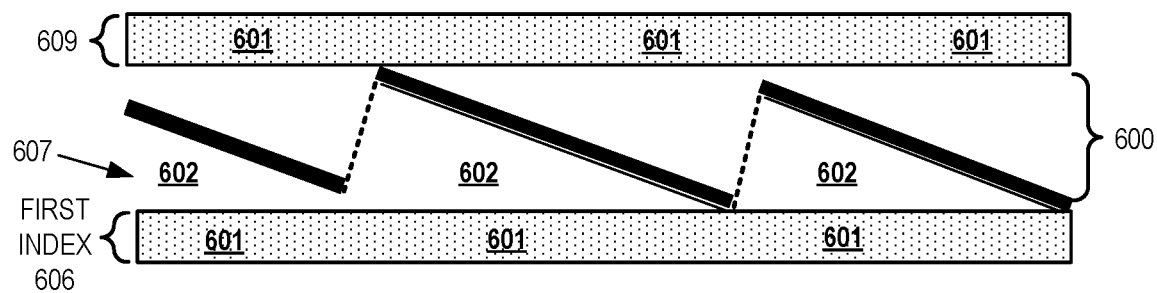

FIGS. 8A-8C illustrate the same fabrication techniques as FIGS. 7A-7C. In FIG. 8D, third refractive layer 609 is secured over the Fresnel surface 600. In the illustrated embodiment, the third refractive layer 609 has the first refractive index because it is made of the same material 601 as the first refractive layer. In some embodiments, the third refractive layer 609 is a different material than material 601.

Figure 8E:
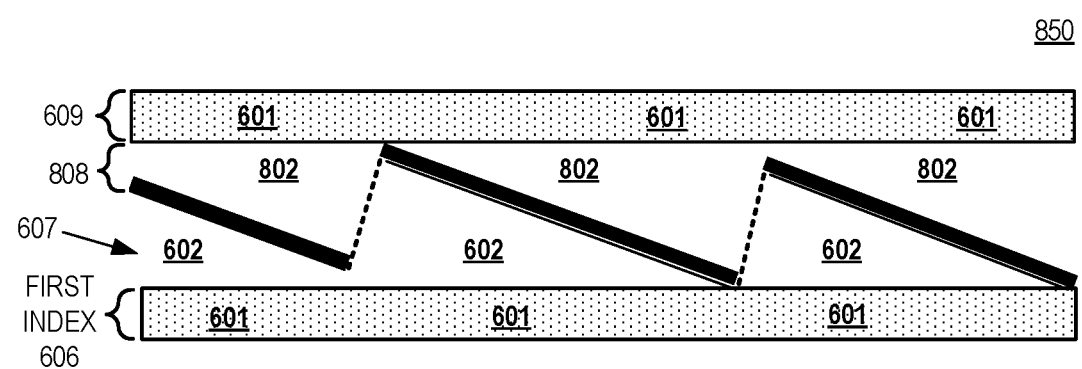

In FIG. 8E, replica gaps between the third refractive layer 609 and the Fresnel surface are filled with a curable material 802 having the second index of refraction (same as material 602). The curable material 802 is then cured, which may adhere third refractive layer 609 to Fresnel surface 600. Curable material 802 may be adhered to coating 633, the draft surfaces 613, and the third refractive layer 609.

Figure 9:
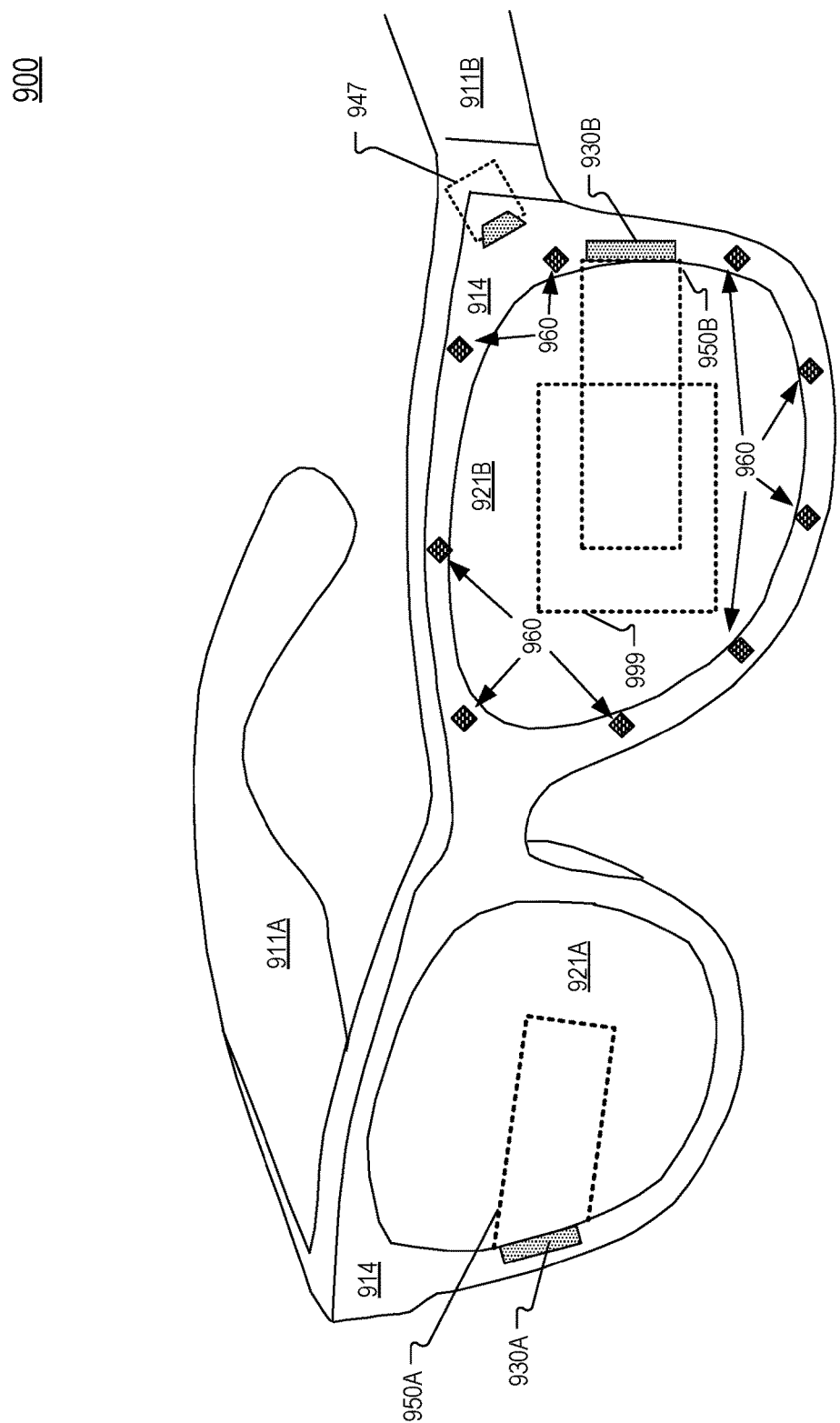
FIG. 9 illustrates an example head mounted display (HMD) that may include a Fresnel surface for directing infrared light reflected off an eye to a camera, in accordance with an embodiment of the disclosure.

FIG. 9 illustrates an example HMD 900 that may include a Fresnel surface for directing infrared light reflected off an eye to a camera, in accordance with an embodiment of the disclosure. HMD 900 includes frame 914 coupled to arms 911A and 911B. Lenses 921A and 921B are mounted to frame 914. Lenses 921 may be prescription lenses matched to a particular wearer of HMD or non-prescription lenses. The illustrated HMD 900 is configured to be worn on or about a head of a user of the HMD.

In FIG. 9, each lens 921 includes a waveguide 950 to direct image light generated by a display 930 to an eyebox area for viewing by a wearer of HMD 900. Display 930 may include an LCD, an organic light emitting diode (OLED) display, micro-LED display, quantum dot display, pico-projector, or liquid crystal on silicon (LCOS) display for directing image light to a wearer of HMD 900.

The frame 914 and arms 911 of the HMD 900 may include supporting hardware of HMD 900. HMD 900 may include any of processing logic, wired and/or wireless data interface for sending and receiving data, graphic processors, and one or more memories for storing data and computer-executable instructions. In one embodiment, HMD 900 may be configured to receive wired power. In one embodiment, HMD 900 is configured to be powered by one or more batteries. In one embodiment, HMD 900 may be configured to receive wired data including video data via a wired communication channel. In one embodiment, HMD 900 is configured to receive wireless data including video data via a wireless communication channel.

Lenses 921 may appear transparent to a user to facilitate augmented reality or mixed reality where a user can view scene light from the environment around her while also receiving image light directed to her eye(s) by waveguide(s) 950. Consequently, lenses 921 may be considered (or include) an optical combiner. In some embodiments, image light is only directed into one eye of the wearer of HMD 900. In an embodiment, both displays 930A and 930B are included to direct image light into waveguides 950A and 950B, respectively.

The example HMD 900 of FIG. 9 includes an array of infrared emitters (e.g. infrared LEDs) 960 disposed around a periphery of lens 921B in frame 914. The infrared emitters emit light in an eyeward direction to illuminate an eye of a wearer of HMD 900 with infrared light. In one embodiment, the infrared light is centered around 850 nm. Infrared light from other sources may illuminate the eye as well. The infrared light may reflect off the eye and be received by a Fresnel reflector 999 selectively coated with a hot mirror and configured to direct and focus the reflected infrared light to camera 947. Fresnel reflector 999 may have an off-axis Fresnel lensing shape to direct the reflected infrared light to camera 947. In this way, camera 947 is able to image the eye of a wearer of HMD 900. Camera 947 may be mounted on the inside of the temple of HMD 900. The images of the eye captured by camera 947 may be used for eye-tracking purposes. The optical structures disclosed in FIGS. 4A-8E may be utilized as Fresnel reflector 999. Although the optical structure may be in the user's vision, the Fresnel surface passes scene light to the eye essentially unaffected by the Fresnel surface, as discussed in connection with FIGS.

4A-8E. The Fresnel reflector 999 can be included in lenses 921 as covering the whole waveguide 950 or covering a portion of waveguide(s) 950. Although camera 947, infrared emitters 960, and Fresnel reflector 999 are illustrated on only one side of HMD 900, they of course may be duplicated on the other side of HMD 900 to facilitate infrared imaging of both eyes of a wearer of HMD 900.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A computing device may include a desktop computer, a laptop computer, a tablet, a phablet, a smartphone, a feature phone, a server computer, or otherwise. A server computer may be located remotely in a data center or be stored locally.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An optical structure comprising:
    a refractive material having a refractive index;
    a Fresnel surface formed in the refractive material, wherein the Fresnel surface includes active surfaces and draft surfaces;
    a dichroic reflective coating selectively disposed on the active surface; and
    a second coating selectively disposed on the draft surfaces, wherein light propagating through the dichroic reflective coating experiences a same phase shift as the light propagating through the second coating.

2. The optical structure of claim 1 further comprising:
    a transparent material having a same refractive index as the refractive material, wherein the dichroic reflective coating and the second coating are immersed in the transparent material.

3. The optical structure of claim 2, wherein a top of the transparent material is flat and in parallel with a flat bottom of the refractive material, the Fresnel surface disposed between the top of the transparent material and the flat bottom of the refractive material.

4. The optical structure of claim 2, wherein a first average refractive index of the dichroic reflective coating is different from a second average refractive index of the second coating.

5. The optical structure of claim 2, wherein the transparent material is the same as the refractive material.

6. The optical structure of claim 2, wherein the transparent material is bonded to dichroic reflective coating and the second coating.

7. The optical structure of claim 1, wherein the dichroic reflective coating is configured to pass visible light and reflect near-infrared light.

8. The optical structure of claim 7, wherein the second coating passes visible light and passes near-infrared light.

9. The optical structure of claim 1, wherein the dichroic reflective coating is a multilayer coating, and wherein the second coating consists of a single layer.

10. The optical structure of claim 1, wherein the dichroic reflective coating is a multilayer coating, and wherein the second coating is also multilayer.

11. A head mounted display (HMD) comprising:
    a camera; and
    an optical combiner configured to pass visible light to an eyebox area and configured to direct infrared light to the camera, wherein the infrared light is received from the eyebox area, the optical combiner including:
        a refractive material having a refractive index;
        a Fresnel surface formed in the refractive material, wherein the Fresnel surface includes active surfaces and draft surfaces;
        a dichroic reflective coating selectively disposed on the active surface; and
        a second coating selectively disposed on the draft surfaces, wherein light propagating through the dichroic reflective coating experiences a same phase shift as the light propagating through the second coating.

12. The HMD of claim 11 further comprising:
a transparent material having a same refractive index as the refractive material, wherein the dichroic reflective coating and the second coating are immersed in the transparent material.

13. The HMD of claim 12, wherein a top of the transparent material is flat and in parallel with a flat bottom of the refractive material, the Fresnel surface disposed between the top of the transparent material and the flat bottom of the refractive material.

14. The HMD of claim 12, wherein a first average refractive index of the dichroic reflective coating is substantially the same as a second average refractive index of the second coating.

15. The HMD of claim 12, wherein the dichroic reflective coating is configured to pass visible light and reflect near-infrared light.

16. The HMD of claim 15, wherein the second coating passes visible light and passes near-infrared light.

17. The HMD of claim 12, wherein the transparent material is the same as the refractive material.

18. The HMD of claim 11, wherein the dichroic reflective coating is a multilayer coating, and wherein the second coating consists of a single layer.

19. The HMD of claim 11, wherein the dichroic reflective coating is a multilayer coating, and wherein the second coating is also multilayer.

20. The HMD of claim 11 further comprising:
at least one infrared source configured to emit the infrared light toward the eyebox area, wherein the camera includes a filter that is configured to pass the infrared light emitted by the at least one infrared source and reject other light.

\* \* \* \* \*